United States Patent [19]

Parikh et al.

[11] Patent Number: 5,243,647
[45] Date of Patent: Sep. 7, 1993

[54] METHOD AND APPARATUS FOR BROADBAND SIGNAL DISTRIBUTION

[75] Inventors: Himanshu Parikh, Lawrenceville; Paul Borsetti, Jr.; Vibha Rustagi, both of Duluth; Mark E. Schutte, Sugar Hill, all of Ga.

[73] Assignee: Scientific-Atlanta, Inc., Norcross, Ga.

[21] Appl. No.: 896,447

[22] Filed: Jun. 10, 1992

[51] Int. Cl.$^5$ .............................................. H04N 7/167
[52] U.S. Cl. ........................................... 380/4; 380/10; 380/20
[58] Field of Search ................................ 380/4, 10, 20

[56] References Cited

U.S. PATENT DOCUMENTS

| | | | |
|---|---|---|---|
| 4,443,815 | 4/1984 | Hempell | 380/10 |
| 4,716,587 | 12/1987 | Fausone et al. | 380/10 |
| 4,864,613 | 9/1989 | Van Cleve | 380/10 |
| 4,878,245 | 10/1989 | Bradley et al. | 380/10 |
| 4,912,760 | 3/1990 | West, Jr. et al. | 380/7 |
| 4,963,966 | 10/1990 | Harney et al. | 358/349 |
| 5,014,309 | 5/1991 | West, Jr. | 9380/7 |
| 5,045,816 | 9/1991 | Bramhall et al. | 332/105 |
| 5,091,938 | 2/1992 | Thompson et al. | 380/10 |
| 5,142,574 | 8/1992 | West, Jr. et al. | 380/20 |

Primary Examiner—David C. Cain
Attorney, Agent, or Firm—William A. Marvin; Frederick W. Powers, III

[57] ABSTRACT

Apparatus for broadband signal distribution is equipped with a detector for detecting when the apparatus is open and is further adapted to receive an entry code generator. If the entry code generator is not installed or, if installed, fails to generate an entry code which matches an authorized entry code stored in the apparatus, the apparatus enters a particular mode of operation whereby service provided by the apparatus is interfered with. The entry code generator comprises a circuit board for coupling with an electrical connector of the apparatus having at least one ear which precludes closure of a cover to the apparatus. A method of screening access to the apparatus from others than authorized service personnel includes waiting a predetermined period of time for coupling the access code generator before service is interfered with. Furthermore, the stored access code may be changed or the predetermined time varied by addressable command from a headend of a broadband signal distribution system.

34 Claims, 8 Drawing Sheets

METHOD AND APPARATUS FOR BROADBAND SIGNAL DISTRIBUTION

BACKGROUND OF THE INVENTION

1. Technical Field

The present invention relates to broadband signal distribution equipment for distributing communication signals, and, in particular, to a method and apparatus of broadband signal distribution whereby interference with the broadband signal distribution can be prevented when access to an enclosure housing the distribution equipment is authorized.

2. Description of the Prior Art

The theft of cable television signals by unauthorized persons has plagued the cable television industry since its inception. New systems and methods are continually being developed to prevent signal theft. One category of systems for preventing signal theft utilizes a signal distribution apparatus for distributing CATV signals locally to various subscribers. Such a distribution apparatus is disclosed in U.S. Pat. No. 4,963,966 to Harney et al. Piracy is prevented by encasing the distribution apparatus in an enclosure and locating the enclosure off of the subscribers' premises. As a result, pirates have reduced opportunity to examine and effect changes to system circuitry of the signal distribution apparatus. The enclosures are capable of both aerial mounting on, for example, a telephone pole, or pedestal mounting for use at installations of underground cable or for placement in a locked room, for example. In addition, the enclosures contain tamper prevention circuitry for disabling the signal distribution apparatus when the enclosure is opened. When service of the signal distribution apparatus is necessary, the tamper prevention circuitry can be inhibited through a signal transmitted from the headend from which the broadband signal originates. A serviceman can then access the enclosure without disabling the signal distribution apparatus.

The signal distribution apparatus can perform such functions as premium channel interdiction in which an interfering signal is introduced into the television signal at a subscriber's location. This technique ensures that events carried on premium channels are available only to those subscribers authorized to receive the events. Such an interdiction system is described in U.S. Pat. No. 4,912,760 to West, Jr. et al. The signal distribution apparatus contains at least one microprocessor controlled oscillator and switch control electronics to secure several premium television channels. Control is accomplished by injecting an interfering or jamming signal into unauthorized channels from the pole-mounted unit. To improve efficiency and to save costs, one oscillator may be used to jam several premium television channels. This technique reduces the amount of required hardware and maximizes system flexibility. The oscillator output jamming signal frequency is periodically moved from channel to channel. Consequently, the oscillator is frequency agile and hops from jamming one premium channel frequency to the next. Costs are reduced since a single interdiction unit may serve a plurality of subscribers.

The cable television industry has additionally been pressured by subscribers to service defective system equipment promptly in order to minimize periods of signal loss. Accordingly, service of system equipment, including distribution apparatus, must be conducted around the clock. In order to reduce the costs of providing such comprehensive service, the number of employees and the amount of time needed to access and service a particular distribution apparatus must be reduced. However, if access is made easier, the distribution apparatus becomes susceptible to piracy. By the same token, systems and methods for preventing signal theft oftentimes make the service of distribution apparatus slow, inconvenient, and expensive. Accordingly, there is a desire in the industry to provide a signal distribution apparatus that prevents piracy but is still easily and efficiently serviced.

SUMMARY OF THE INVENTION

It is an object o the present invention to provide a broadband signal distribution apparatus which prevents piracy and can be efficiently serviced.

It is a further object of the present invention to provide a broadband signal apparatus having a tamper prevention system which may be serviced without the need for communication with and assistance from the headend.

It is a further object of the present invention to provide a tamper override system in a broadband signal distribution apparatus which is secure from pirates, is efficiently serviced, and does not require significant additional expense for the implementation.

It is further object of the invention to provide a method for screening access to a broadband signal distribution system which both prevents signal theft and facilitates access by authorized personnel.

It is a further object of the present invention to provide a tamper override module for locally overriding a tamper prevention system contained in a signal distribution system without the need for communication with and assistance from the headend.

In accordance with the present invention, a broadband signal distribution apparatus includes a signal receiver for receiving a broadband signal from a headend and a signal distributor for distributing the broadband signal to at least one subscriber location. The signal receiver and the signal distributor are housed in an enclosure. The signal distribution apparatus additionally includes a tamper for detecting when the enclosure is opened, a device for applying an entry code, and a storage device for storing an authorized access code. A comparator compares the applied entry code with the authorized access code. In response to the tamper detector and the comparator, interfering circuitry interferes with the operation of the signal distributor if the enclosure is opened and the entry code does not match the authorized access code.

The present invention achieves the objective of preventing piracy by providing a secure enclosure, a tamper detector, and interfering circuitry for interfering with the operation of the signal distribution apparatus when the enclosure is opened by an unauthorized person. As a result, operator revenue is not depleted by service pirates. In addition, the present apparatus achieves the objective of facilitating service of the signal distribution apparatus by enabling an authorized serviceman to apply an entry code which prevents operation of the interfering circuitry. Accordingly, additional personnel are not required to assist a serviceman in accessing the signal distribution apparatus. Furthermore, reliance upon communication between a local serviceman and personnel at the headend is not required. Moreover, the invention may be realized without significant additional expenditures for new equipment and installation. Accordingly, the present invention prevents piracy while permitting service to be accomplished rapidly and at a reduced cost.

In further accordance with the present invention, a method is provided for screening access to a broadband signal distribution apparatus including a broadband signal receiver for receiving a broadband signal from a headend, a broadband signal distributor coupled to said broadband signal receiver for distributing the broadband signal to at least one subscriber location, and an enclosure housing the broadband signal receiver and broadband signal distributor. The method includes the steps of storing an authorized access code, detecting access to the enclosure, and determining whether an entry code is applied, the entry code is compared to the authorized access code. The method further includes the step of interfering with the broadband signal distributor if an entry code is not applied or if an applied entry code does not match the authorized access code.

The present invention achieves the objective of preventing signal theft by interfering with the operation of the broadband signal distributor. However, the interfering step can be avoided if an entry code which matches a stored authorized access code is applied. Therefore, access to the broadband signal distribution apparatus by authorized personnel may be accomplished.

Furthermore, the present invention provides a tamper override module including a device for setting an entry code, an interface adapted to be connected to a broadband signal distribution apparatus, and an output device for outputting the entry code through the interface to the broadband signal distribution apparatus. The present invention achieves the objective or overriding a tamper prevention system without the need for communication with and assistance from the headend by providing a tamper override module which may be connected to a broadband signal distribution apparatus. The tamper override module outputs an entry code to the broadband signal distribution apparatus. Circuitry in the broadband signal distribution apparatus prevents operation of the tamper prevention system in response to the entry code. Accordingly, access to the broadband signal distribution apparatus is permitted without requiring further assistance from or communication with the headend. Consequently, subscribers are provided the service they demand, servicemen can perform their job without unnecessary delay, and cable operators are protected from pirates without significant additional expense.

The above and further objects and advantages of the invention will become apparent with reference to the detailed disclosure of the invention below and the accompanying illustrative figures.

DETAILED DESCRIPTION OF THE PREFERRED EMBODIMENTS

A method and apparatus for broadband signal distribution according to the present invention will be discussed in the context of the off-premises cable television distribution apparatus disclosed in U.S. Pat. No. 4,912,760, the disclosure of which is herein incorporated by reference in respect to those features not described in the present specification. However, the present invention is not limited to interdiction cable television systems but is also applicable to other off-premises systems requiring periodic service and operational security. The technology may also be applied to on-premises systems and technologies, for example on-premises addressable converters and addressable descrambler converter technologies.

A detailed discussion of the interdiction system in which the present invention may be implemented is also provided in U.S. Pat. No. 4,963,966, also incorporated herein by reference. Furthermore, U.S. patent application Ser. Nos. 446,695; 498,084, 503,423; and 625,901, entitled "CATV Pay Per View System Method and Apparatus," also incorporated herein by reference, disclose details of off-premises subscription television apparatus related by subject matter to the present invention. Topics relating to interdiction systems such as jamming signal frequency calibration, gain adjustment and jamming control oscillator will not be addressed herein in detail.

Figure 1:
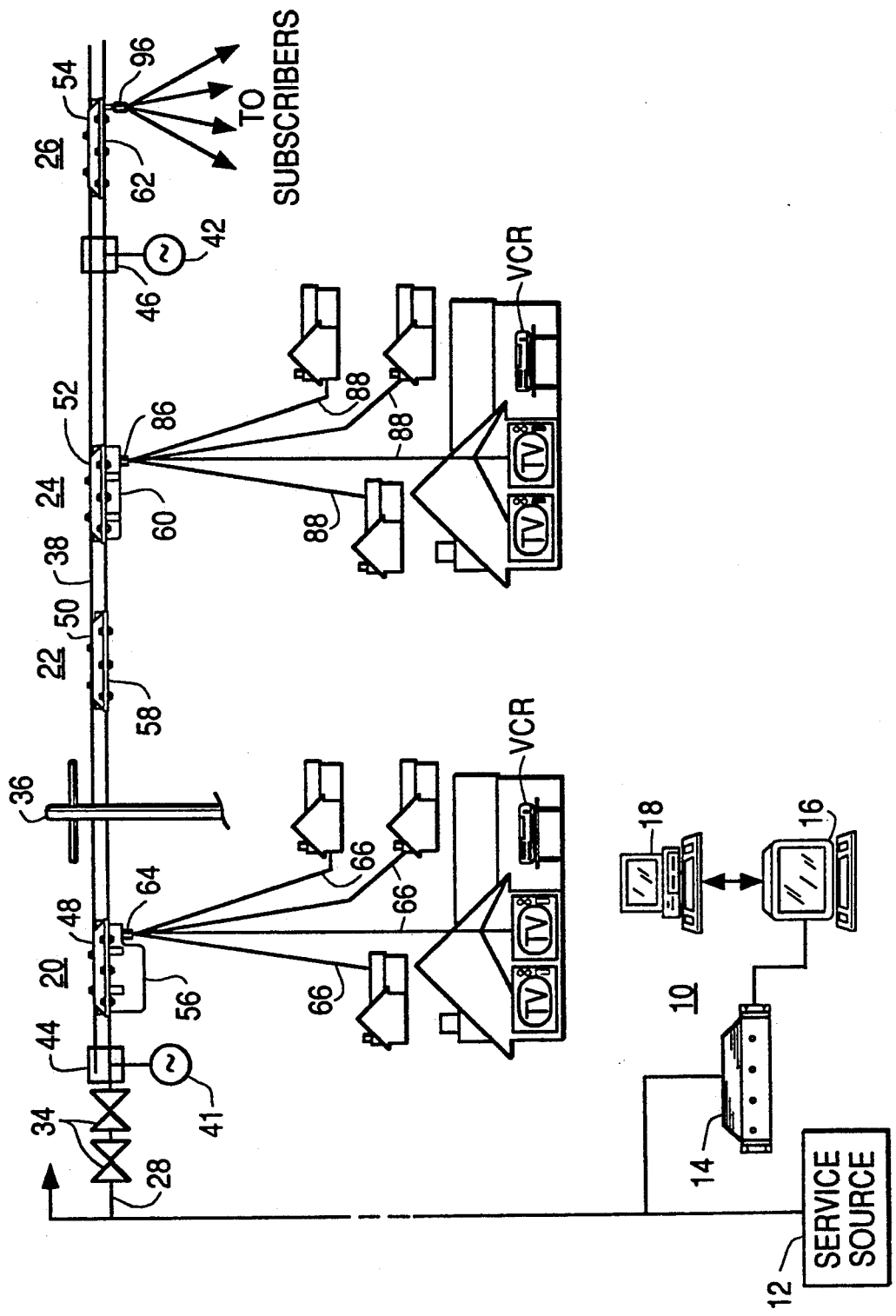
FIG. 1 illustrates a cable television distribution system including a plurality of signal distribution apparatuses.

FIGS. 1-8 comprise drawings of the present invention in which similar reference numerals are used throughout to designate similar elements. FIG. 1 is a general block diagram of a subscription television system and, in particular, a cable television system. Subscription television system is intended herein to include any television service system such as over-the-air systems, satellite signal access systems and such television delivery systems. Cable television system as used herein refers to all systems involving the transmission of broadband signals over a transmission medium (fiber optic cable or coaxial cable) to remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber as used herein refers to either a private subscriber or a commercial user of the cable television system.

Headend 10 is a connecting point to a serving cable or trunk 28 for distributing, for example, television or other communication channels from service source 12 over feeder lines to drops 66, 88 and finally to subscriber locations. For reference purposes, an Electronic Industries Association (E.I.A.) standard cable television frequency allocation scheme is employed and referred to herein. Typically, in such systems, television channels of source(s) 12 are modulated and frequency division multiplexed together to comprise a broadband signal which may have a bandwidth in excess of one gigahertz. However, one may apply the principles of the present invention to other known standard or non-standard frequency allocations. Further, a National Television Subcommittee (N.T.S.C.) standard television signal at baseband is generally considered in the following description. However, the principles of the present invention apply equally to other standard and non-standard baseband standard definition and proposed high definition television signal formats. Also, the principles of the present invention are not limited to television services furnished from a headend but may include utility meter reading, burglar alarm reporting, digital or other stereophonic audio delivery systems, video or telephonic services and the like.

Headend 10 typically comprises a source of television programming 12. The television program source 12 may be a satellite television receiver output, a program produced by a television studio, program material received over a microwave or broadcast television link, a cable television link output, or any other source of television or other subscription programming consistent with the present invention. The program source material need not be limited to conventional television but may comprise teletext, videotext, program audio, utility data, or other forms of communication to be delivered to a remote location over the serving cable or trunk line 28 and subsequently over feeder lines and, then, drop lines 66, 88. Communications used to authorize or terminate services or different levels of service or to perform or monitor system functions are initiated via data entry to a computer system including a system manager computer 16 and a billing computer 18.

Conventionally, trunk line 28, feeder lines, and drop lines 66, 88 are constructed of coaxial cable. For higher performance, any one of these lines could be a fiber optic cable. Due to the cost of the installation and the need for a high quality initial transmission from headend 10, trunk line 28 is typically the only line constructed of fiber optic cable.

Program material provided by the service source 12 may be included within a regular service offering, or premium (requiring extra payment) or otherwise restricted or desirably secured from receipt at unauthorized receiver locations. It may be provided over any channel of the 50–550 MHz (or larger band) cable television spectrum. "Premium channel" or "premium programming" as used herein refers to a channel or program which is secured from unauthorized receipt either because of its premium or restricted status or because a regular service subscriber must incur an additional fee for reception.

Normally, all premium programming in cable television systems is scrambled. However, in accordance with interdiction system technology, premium programming is transmitted in the clear, and interdiction (service denial) is applied at off-premises signal distribution apparatus 20 to jam reception of unauthorized premium programming. Off-premises signal distribution apparatus 20, 22, 24, and 26 may also form part of a reverse data transmission path as will be discussed in greater detail below. Off-premises signal distribution apparatus 20, 22, 24, and 26 respectively comprise housings or enclosures including casings 56, 58, 60, and 62 and covers 48, 50, 52, and 54.

It is likely that cable systems will gradually make the transition to an interdiction system, for example, as new subscribers are added. During a transition period, headend 10 may provide scrambled television programming as well as premium programming in the clear and scrambler may be provided as long as converters/decoders remain in the system for unscrambling scramble program transmission. For example, off-premises distribution apparatus 24 may be coupled to subscribers still having on-premises converters/decoders and off-premises unit 22 may be utilized to couple new subscribers to the system. In certain instances, converter/decoders at subscriber locations may later be entirely replaced by interdiction apparatus of the present invention. Descrambling or decoding equipment may also be provided at an off-premises housing.

Headend 10 includes an addressable data transmitter 14 for transmitting global commands and data downstream to all subscribers, group addressed communications to a particular group of subscribers, or specifically addressed communications for reception by a particular subscriber. Such forward data transmission may be conducted over a separate data carrier from the cable television spectrum, for example, at 108.2 megahertz. Forward data transmission may also be over an unused default channel from the television spectrum. Global commands generally take the form of operation code and data while addressed communications further include the unique address of a particular subscriber.

A high speed data transmission format may be provided for communication between headend 10 and apparatus 56 via transmitter 14. One such format may be a biphase data encoding at a data rate of as least 12 to 14 kilobits per second and preferably 19.2 kilobits per second, frequency modulated on the 108.2 MHz data carrier (in the FM broadcast band). Frequency shift keying, period shift keying, or other related data transmission schemes may be used in the alternative. Principles surrounding appropriate data rate and format selection include meeting objective of handling plural serial communications arrangements and maximizing data throughput. For example, the preferred addressable data transmitter queues communications for transmission and is capable of transmitting hundreds of communications per second.

In an alternative embodiment, forward data communications may take the form of in-band signals sent with a television channel superimposed, for example, upon an audio carrier during a special time period, for example, a period corresponding to the vertical blanking interval of the associated video signal, Such data communications further complicate data reception at interdiction apparatus and are desirably eliminated. However, in-band signaling may be required for the operation of certain converter/decoders known in the art.

Thus, communications, in particular, commands to authorize service to a particular subscriber, may be transmitted in-band or on a separate data carrier and typically involve transmitting a unique address of a particular subscriber unit or group of subscribers, a command or operation code and data. Decoders in the system receive the command, decode it, determine if the command is to be acted on, and if so perform the desired action such as provide a subscriber with pay-per-view credits or generally authorize services. Responsive to the control of the system manager computer 16, channel program or authorization data is transmitted via and addressable data transmitter 14 over a trunk line 28 to feeder lines with interspersed signal amplifiers 34 and power supply equipment 41, 42, 44, 46 provided as required. The serving signal is dropped via drops 66, 88 to a subscriber location at a pole 36 or from a pedestal at underground cable locations or in equipment closets.

Signal distribution apparatus 24 may be connected via connector 86 and drop 88 to a conventional converter/decoder which serves several functions. Responsive to an addressed communication from headend addressable data transmitter 14, channel or program authorization data is updated in an authorization memory if the address associated with the addressed communication matches a unique address of the subscriber decoder. For example, the subscriber address may comprise a plurality of bits over and above the actual number of subscribers in a system, the additional bits insuring the security of the address. The premium channel or program is then stored in the authorization memory of the converter/decoder. Television programming is normally converted to an otherwise unused channel such as channel 3 or 4 of the television spectrum by a converter portion of converter/decoder. Its premium status is checked against the data stored in authorization memory. If the programming is authorized, the decoder portion of the converter/decoder is enable to decode authorized scrambled premium programming.

The provided television receiver TV may be a conventional television receiver or may be a so-called cable ready television receiver. Because of the advent of cable ready television receivers, there is no longer a requirement at a subscriber premises for the converter portion of a converter/decoder because a converter is built into such television receivers. The television receivers may also comprise video cassette recorders (VCRs) or other recording devices which are likewise cable ready and adapted to receiver a signal comprising a regular subscription service offering. A television receiver display may be adaptedly connected by the subscriber to receive over-the-air broadcasts, satellite repeated signals, and other alternative sources of signals such as taped programs via VCRs.

Subscriber premises shown at the end of the drops 66, 68 may comprise single family homes, multiple family dwellings such as apartment complexes, hotel, hospitals and the like, or commercial establishments such as restaurants, bars, theaters, factories and the like. The subscriber premises should not be narrowly construed to comprise only single family dwelling units shown in the accompanying drawings.

In accordance with a cable television system provided with interdiction or other signal distribution apparatus, units 20, 22, 24, and 26 are mounted on a strand 38 supporting the cable to a pole 36, or provided via a pedestal, as is shown more particularly in U.S. Pat. No. 4,963,966. The units may also be mounted indoors in an equipment closet of a multiple dwelling unit or to the side of a subscriber's premises. Inside the units is common control circuitry for tapping into the broadband television and data transmission spectrum. Referring to the pole 36, there is shown a stand-mounted apparatus 56 serving four drops 66 to subscribers via connector 64. In practice, four or more subscribers and up to four or more drops 66 may be served by signal distribution apparatus 20. In addition to the common control circuitry, four or more plug-in subscriber modules may be provided for an off-premises housing. Also, according to the present invention, additional services requiring two way data transmission such as subscriber polling, home shopping, burglar alarm, energy management and pay-per-view services may be provided via four or more special service modules comprising reverse path signal combining circuitry of apparatus 56.

Desirably, all cable television equipment may be removed from the subscriber premises. However, for the provision of certain additional services, some on-premises equipment is unavoidable. For example, a subscriber transaction terminal apparatus may be provided in a subscriber's premises. The subscriber transaction terminal may simply comprise a subscriber-controlled data transmitter for transmitting data on the subscriber drop 66 in only one direction, namely, to signal distribution apparatus 20. For purposes of this description, the subscriber premises will be assumed to include at least one cable ready conventional television receiver, TV or VCR. Consequently, subscriber equipment need not comprise a tunable converter for converting a received cable television channel to an unused channel such as channel 3 or 4. The subscriber transaction terminal device comprises data entry or sensing means, data confirmation means, i.e., a display or alarm, if required, and a data transmitter coupled between the drop cable and the cable ready television receiver.

Power for signal distribution apparatus 20 may be provided over the cable from the headend direction via power supplies 41,42 or be provided via the subscriber drip 66 or by a combination of such means. Foreseeably, power may be even provided by rechargeable means such as solar cells or other external or replaceable internal sources such as batteries. The subscriber transaction terminal equipment is preferably battery powered.

All signal distribution apparatus 20, 22, 24, and 26 include a tamper-resistant housing or otherwise secured enclosure as described by U.S. Pat. No. 4,963,966 or secured in a locked equipment closet of an apartment complex or both. If located in a place exposed to the elements, the housing should be water-tight. Also, the housing should be designed to prevent radio frequency leakage.

Signal distribution apparatus 20 is uniquely addressable by headend 10 just as is a known converter/decoder. If two bits of a plural bit unique subscriber address are associated with uniquely identifying one plug-in slot for one of four subscriber modules, common control circuitry may be uniquely addressed with remaining address data not used to secure the data communication. Of course, this concept may be utilized to address any number of subscriber modules associated with the signal distribution apparatus. Just as premium programming is transmitted in the clear and since no data communication is necessarily required with a subscriber premises, a subscriber address need not be transmitted in a secure form. Nevertheless, address security may be desirable so long as converter/decoder or other unique address requisite equipment is provided at a premises.

Signal distribution apparatus 20 comprises addressable common control circuitry, an optional plug-in special service module and up to four (or more) plug-in subscriber modules. Upon receipt of subscriber specific premium program, subscriber credit or channel authorization data, the data are stored at memory of common control circuitry of signal distribution apparatus 20.

Signal distribution apparatus 20 further comprises a diplexer for providing a forward transmission path which is coupled to automatic gain control circuitry of the common control circuitry. The common control circuitry forwards jamming frequency control data to a subscriber module. Channel interdiction circuitry associated with each subscriber module then selectively jams unauthorized premium programming dropped via a particular drop 66 to a particular subscriber. Consequently, signal distribution apparatus 20 is reasonably compatible with downstream addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises signal distribution apparatus 20 or derive a signal from shielded and bonded cables which should likewise be maintained secure from radio frequency leakage.

Two way data transmission is provided via a so-called sub-split frequency spectrum comprising the band 5-30 megahertz for upstream, reverse path transmission toward headend 10 and a spectrum from 54-550 megahertz for downstream forward transmission. In particular, an amplitude shift keyed data transmission signal at approximately 5 MHz is used for communication on drop 66, while a binary phase shift keyed signal is used for upstream data transmission in the T8 band to headend 10. Distribution amplifiers 34 distributed along the distribution plant according to known prior art design techniques separate and separately amplify the two transmission bands. They are distributed along the transmission path in a manner so as to preclude the carrier-to-noise ratio of either transmission path from being two low.

Also, at a headend 10, there is located a radio frequency data receiver and data processor for receiving data transmissions from the off- or on-premises subscriber equipment. Details of this equipment are more particularly provided by application Ser. No. 07/498,084, incorporated as necessary by reference.

Figure 2:
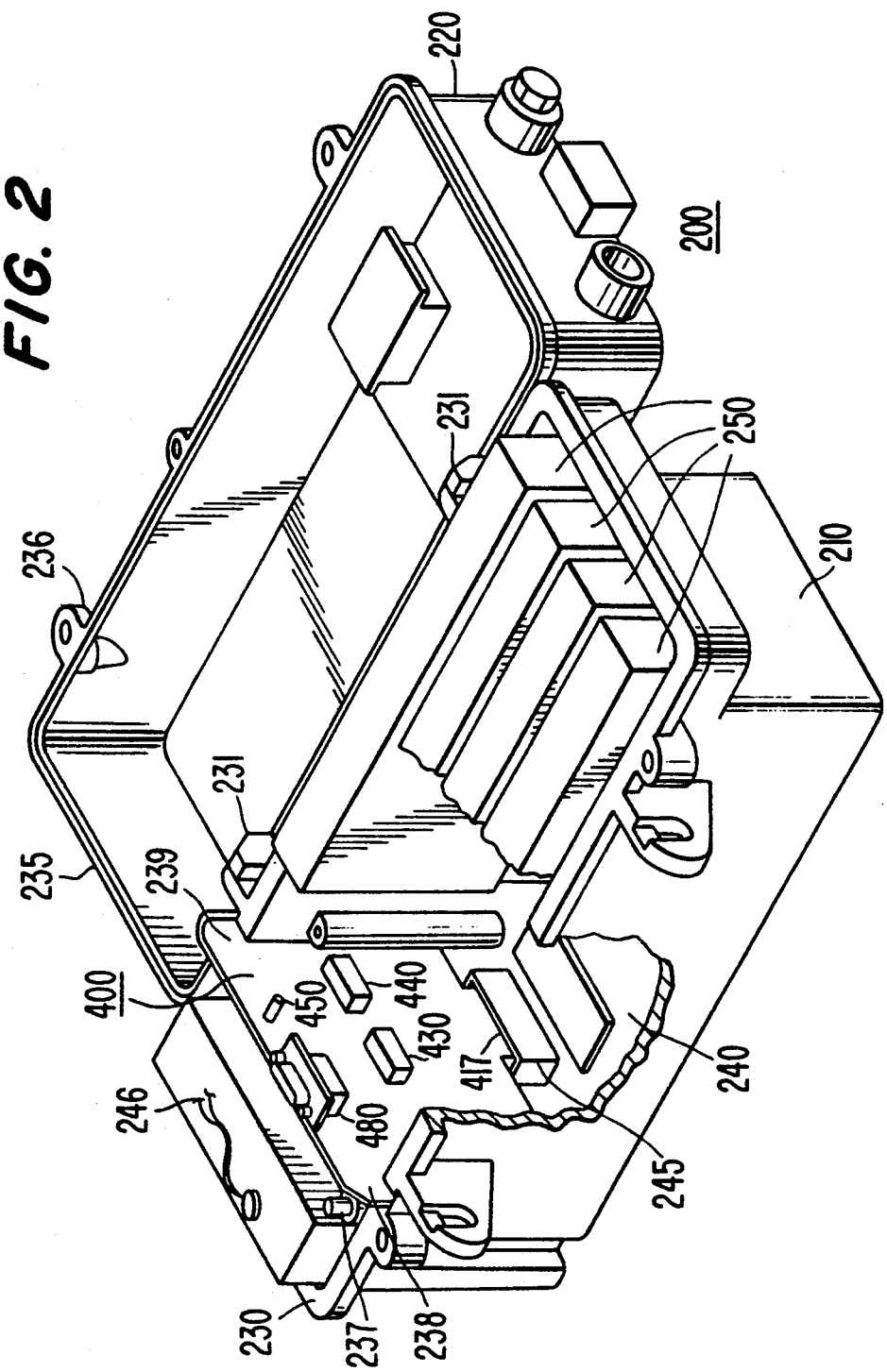
FIG. 2 is a cutaway view of a broadband signal distribution apparatus having an interface with a tamper override module coupled thereto.
Figure 3:
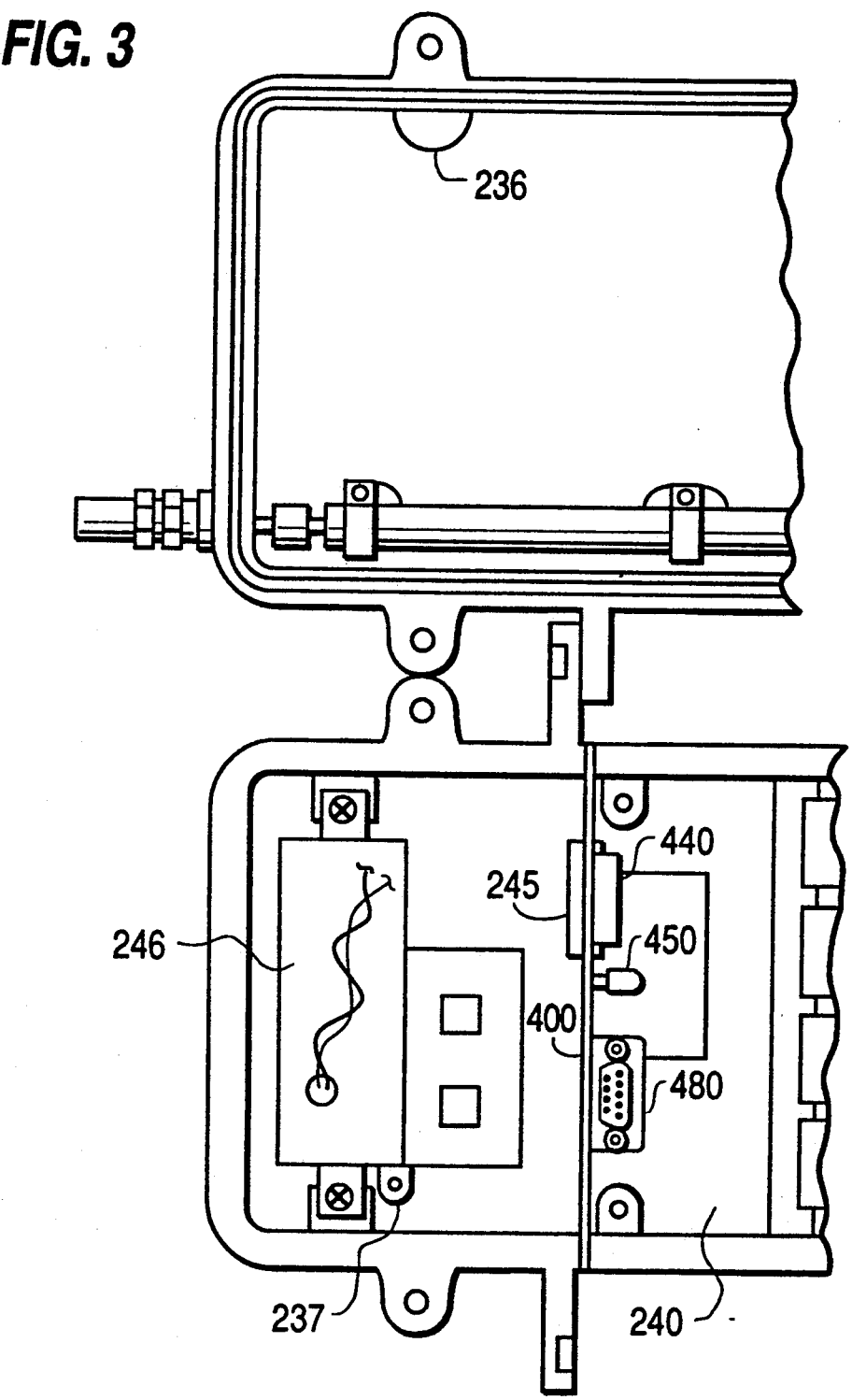
FIG. 3 is a view from above of a broadband signal distribution apparatus having an interface with a tamper override module coupled thereto.

With reference to FIGS. 2 and 3, the signal distribution apparatus 20 of the present invention will be described in further detail. While the method and apparatus according to the present invention will be described in the context of being located at the entry to a subscriber's premises, it will be appreciated that the present invention may be utilized anywhere along the signal path to a subscriber premises where a service pirate may obtain access to the distributed signals. The invention thus may be utilized not only in connection with apparatus 20 but apparatus 34, 44, 22, 24, 46, 26 and so on along the signal path via serving cable or drop to the entrance into the subscriber's premises.

The signal distribution apparatus 20 includes an enclosure 200 having a casing 210 and a cover 220. Cover 220 rotates about hinges 231 so as to protect enclosed circuitry within casing 210 from damage. Flange 230 and flange 235 extend around the periphery of casing 210 and cover 220, respectively. Further details of the enclosure can be found in U.S. Pat. No. 4,963,966 and will not be provided here.

The enclosure houses circuitry, for example, mother board 240, further described in connection with FIG. 5 below, individual subscriber modules 250, further described below in connection with FIG. 6, and power supply circuitry 246. Mother board 240 and individual subscriber modules 250 are further described below in connection with FIG. 5 and 6. FIGS. 2 and 3 depict the enclosure with a tamper override module (TOM) 400 according to the present invention inserted into interface 245, which may be the same interface to motherboard 240 used for receiving a special service module (not shown).

Figure 5:
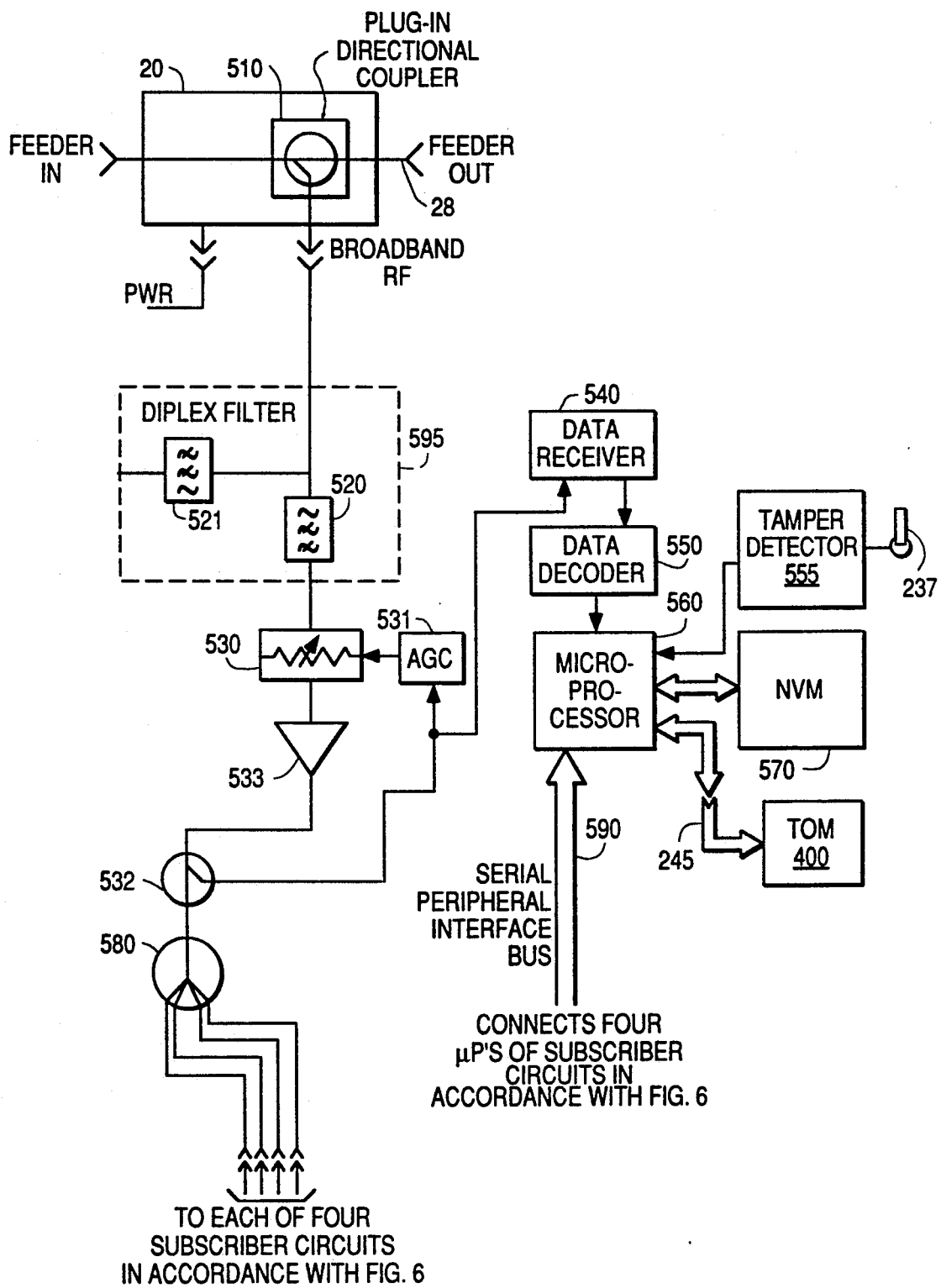
FIG. 5 is block schematic diagram of an addressable common control circuit for a plurality of provided subscriber modules of a signal distribution apparatus including a broadband signal tap, a diplexer connected to the tap, a microprocessor coupled to a tamper override module, tamper detector, a data receiver and decoder, and an automatic gain circuit.

The distribution apparatus is equipped with a plunger 237 which cooperates with boss 236 such that when cover 220 is opened from casing 210 as shown, the plunger, which is conveniently spring mounted, will rise and so open (or close) a contact of an associated tamper detector (FIG. 5). As depicted in FIGS. 2 and 3, the plunger 237 is attached to power supply 246 and the boss 236 is attached to cover 220. However, the invention is not limited in this respect. Plunger 237 and boss 236 may be positioned elsewhere within enclosure 200 to realize the desired functional relationship as would be apparent to one of skill in the art.

If service is required and according to the present invention, a service person upon opening the cover 220 inserts TOM 400 (which in alternative embodiments may comprise a magnetic card, a punch card, or other equivalent device) into interface 245. Thereby, a controller may be satisfied that the entry into the enclosure 200 is authorized provided a code transmitted by the TOM 400 is accepted.

In a preferred embodiment, TOM 400 is equipped with ears 238 and 239 which overlap a volume immediately above flange 230 after it is inserted into casing 210. In this manner, the service person, should he attempt to close the cover 220, will be precluded from closing the cover and so will be reminded to remove the TOM 400.

Figure 4:
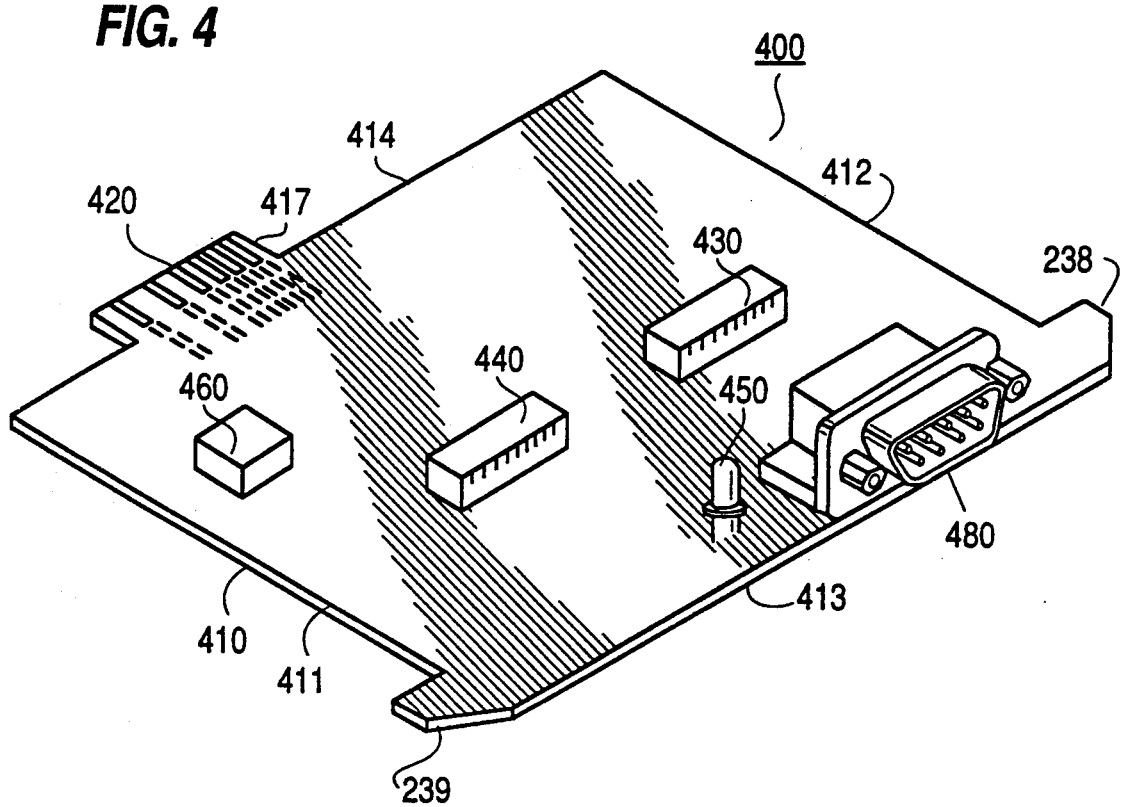
FIG. 4 illustrates a perspective view of a tamper override module.

According to one preferred embodiment, TOM 400 comprises a body portion capable of holding the circuit components described below in connection with FIG. 7. This preferred embodiment of TOM 400 is depicted in FIG. 4. Body portion 410 preferably comprises a card including first and second lateral sides 411, 412 and top and bottom portions 413, 414. The body portion 410 is preferably formed of circuit board material. However, the invention is not limited in this respect. As already suggested, the TOM may simply be a magnetic card such as a plastic credit card, a punched paper card or other equivalent structure sufficing as a key for coupling with a suitably provided interface 245.

Lateral sides of TOM 400 are spaced apart a distance equal to the width of casing 210 so as to snugly fit therein as shown in FIGS. 2 and 3. Ears 238, 239 extend from lateral sides 411 and 412, respectively. The ears 238, 239 are preferably trapezoidal as shown in FIG. 4 but may be any shape so as to preclude closure of cover 220. Ears 238, 239 extends over the flange 230 of casing 210 when the TOM 400 is inserted into the enclosure to thereby prevent the cover 220 from closing. Bottom portion 414 includes an extension 417 for insertion into interface 245 coupled to a controller of motherboard 240, for example, microprocessor 560 (FIG. 5). The extension 417 has an electrical connector comprising plural conductive leads 420 printed thereon for coupling with interface 245 to mother board 240 of FIGS. 2 and 3. The conductive leads 420 extend on body portion 410 to the various circuit components, including converter 430, shift register 440, LED 450, and switch 460 as per FIG. 7. Top portion 413 includes interface 480 extending therefrom, for example, for facilitating communications with the mother board by service personnel for diagnostic or other purposes or with the headend 10 or with subscriber terminal equipment.

Referring to FIG. 4, extension 417 is slightly off-center off bottom portion 414 and interface 245 is suitably mounted on motherboard 240 to receive TOM 400 in only one direction. Furthermore, components such as interface 480 are mounted in such a way as to preclude installation of TOM 400 in any manner other than that shown in FIG. 2.

The common control circuitry of signal distribution apparatus 20 will now be described with reference to the block diagram FIG. 5 for serving four subscriber modules in accordance with the block diagram FIG. 6 and a tamper override module according to FIG. 7. Referring particularly to FIG. 5, feeder cable 28 is shown entering off-premises interdiction apparatus 20 at FEEDER IN and leaving at FEEDER OUT. Power PWR may be provided via the feeder cable, by means of the subscriber drop or locally by internal or external means. Depending on the source of power PWR, input power may be of alternating or direct current.

A directional coupler 510 which may be in the form of a plug-in module taps into the broadband serving cable 28. A broadband of radio frequency signals is thus output to highpass filter 520 of diplex filter 595. Highpass filter 520 passes a downstream band of frequencies, for example, 54-550 MHz comprising at least the cable television spectrum and any separate data carrier frequency, such as 108.2 MHz, and blocks the upstream band of frequencies, for example, 5-30 MHz (in a bi-directional application). For an off-premises signal distribution system, the cable television spectrum may particularly comprise a narrower frequency band from about 54 MHz to 350 MHz.

Lowpass or bandpass filter 421 passes at least the 0-30 MHz spectrum and more particularly a pass band comprising the T8 band from approximately 14-18 MHz. One of twenty-three data channels may be selected for upstream data transmission from within the T8 band to avoid noisy regions of the spectrum.

Circuitry associated with broadband signal "seizure" from the distribution cable 28 may be conveniently mounted on a single board, conveniently named a seizure board of interdiction apparatus 20, more particularly described in FIG. 15 of U.S. Pat. No. 4,963,966, but described in general terms herein as at least comprising the directional coupler 510 and diplex filter 595 of FIG. 5.

A common automatic gain control circuit as disclosed in FIG. 5 comprises variable attenuator 530, RF amplifier 533, directional coupler 532, and AGC control circuit 531. This automatic gain control circuit appropriately regulates the broadband RF signal power to fall within established limits. The common circuitry of FIG. 5 is collocated or closely located to the subscriber modules which will be further described in connection with FIG. 6 and may be contained in the same housing with the special service units for each subscriber as described in U.S. patent application Ser. Nos. 07/618,745 and 07/625,901 filed Nov. 27, 1990.

Also connected to directional coupler 532 is a data receiver 540 for receiving downstream forward data transmissions from the addressable data transmitter 14 located at headend 10. Data receiver 540 receives data transmitted, for example, over a data carrier of 108.2 megahertz and provides unprocessed data to data decoder 550. In accordance with an established protocol and as briefly described above, such data may be in the form of an operation code (command), a subscriber unique address and associated data. Data decoder 550 processes the data and provides the separately transmitted data to microprocessor 560 for further interpretation in accordance with a built-in algorithm. Microprocessor 560 is most efficiently chosen to alleviate as many responsibilities from any microprocessor provided for an individual subscriber module and so is most conveniently an eight bit microprocessor having eight kilobytes of internal code such as a motorola 68HC05C8 or other suitable microprocessor having internal random access memory and program memory.

Received data may be stored in nonvolatile memory (NVM) 570 by microprocessor 560. NVM 570 is preferably three NMC93C46N (64×16) or one NMC93C66N (256×16) by National Semiconductor. However, the invention is not limited in this respect. NVM 570 may store an authorized access code received from the headend, enable/disable information for the tamper system, and/or a tamper detected flag. The tamper detected flag will be stored as a result of operation of tamper detector 555 which provides a contact closure or opening signal over a dedicated lead to microprocessor 560 as a result of the operation of plunger 237 as cover 220 (FIG. 2) is opened. Data may be stored in NVM 570 and jamming frequency control data downloaded when needed to a subscriber module according to FIG. 6 via a serial peripheral interface but 590 connecting microprocessor 560 with separate microprocessors 600 associated with each provided subscriber module as shown in FIG. 6.

Furthermore, in an alternative embodiment, separate microprocessors 600 may be replaced by an application specific integrated circuit which performs functions under the control of microprocessor 560 as taught in U.S. application Ser. No. 07/896,292, entitled "Interdiction Method and Apparatus with Programmable Jamming Effectiveness," Jun. 10, 1992. An exemplary application specific integrated circuit comprises a Scientific-Atlanta part No. 463563/463564 manufactured by AMI/Gould of Pocatello, Idaho. Microprocessor 560 is further coupled to interface 245 for communicating with TOM 400 or a special service module, if provided. Furthermore, microprocessor 560 may communicate, for example, upstream frequency and amplitude control data to microprocessors associated with each special service module, as described in U.S. application Ser. Nos. 07/618,745 and 07/625,901. The special service module may share interface 245 with the TOM 400 or, in an alternative embodiment, may be connected to a separate interface.

Variable attenuator 530 regulates the received broadband of picture carriers to a reference level while the microprocessor 560 controls the jamming carrier level outputs of associated subscriber units within the prescribed range. Microprocessor 560 consequently interprets both global communications addressed to common control circuitry or communications addressed to unique subscribers for operation of subscriber modules such as service credit, authorization commands, operation commands, or any combination thereof. If appropriate, microprocessor 560 ignores global, group addressed, or specifically addressed communications to other signal distribution apparatus or to conventional converter/decoders. An example of global communications peculiar to signal distribution apparatus 20 is premium channel frequency data for each premium channel or channel over which premium programming at a particular point in time is provided via headend 10. Examples of addressed communications to common control circuitry include communications comprising premium channel or programming authorization information, communications instructing the common control circuitry to provide credit to a particular subscriber, or communications changing the authorized access code of the signal distribution apparatus.

Serial peripheral interface buses 590,245 may be two way communications links by way of which microprocessors 600 (FIG. 6) may, at least, provide status reports to microprocessor 560 upon inquiry or TOM (FIG. 7) may supply an access code or request status reports from microprocessor 560. Alternatively, a microprocessor of FIG. 6 may tap into a parallel contention-type bus 590 and bid for communication to either a microprocessor 560 of common equipment or another microprocessor 600 or may directly communicate with any of the other associated microprocessor over a separate serial bus 590. In a similar manner, both a special service module and a TOM may share a bus 245 and likewise bid for communication for access to microprocessor 560 or another microprocessor 600.

Figure 6:
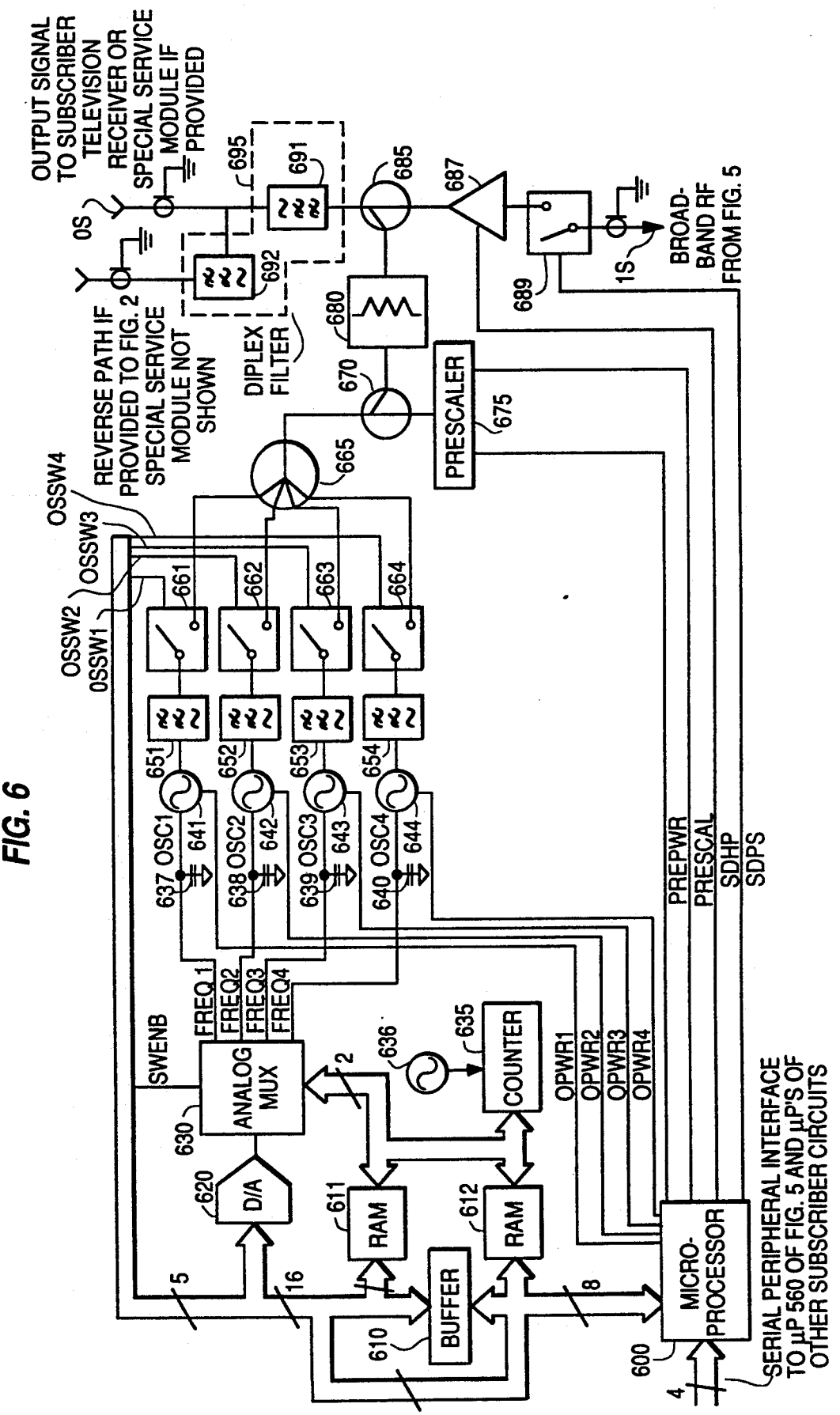
FIG. 6 is a block schematic diagram of one subscriber module of a signal distribution apparatus comprising a microprocessor for selectively controlling the jamming of unauthorized services to a subscriber, associated jamming equipment and a diplexer.

Radio frequency splitter 580 provides broadband radio frequency signals comprising a broadband cable television service spectrum separately to each subscriber module according to FIG. 6 that is provided.

FIG. 6 is an overall block schematic diagram of a subscriber module of signal distribution apparatus 20 including a diplex filter 695. A microprocessor 600 is associated with a particular subscriber module and communicates with microprocessor 560 of FIG. 5 over a serial peripheral interface bus. Microprocessor 600 may comprise an eight bit microprocessor equipped with only two kilobytes of code, this microprocessor being relieved of overall control responsibilities by microprocessor 560. Consequently, microprocessor 600 may conveniently comprise a Motorola 68HC05C3 microprocessor or similar unit. In the alternative embodiment including an application specific integrated circuit, microprocessor 560 may assume the control tasks of microprocessor 600 so that microprocessor 600 can be replaced. Furthermore, analog multiplexer (MUX) 630, D/A converter 620, RAMs, buffers, and prescalars 675 may all be replaced by the application specific integrated circuit.

A 5-30 MHz or other lowpass band, more particularly, a 0-15 MHz lowpass band, may be provided for upstream, reverse transmissions from corresponding subscriber equipment on the subscriber premises. Such a reverse path is completed to the subscriber via terminal OS. Also, power may be transmitted up the subscriber drop to the subscriber module of FIG. 6 and withdrawn at terminal OS.

The broadband radio frequency television spectrum signal from FIG. 5 is provided to terminal IS. Referring to the path connecting terminal IS to terminal OS, there are connected in series a service denying switch 689, a radio frequency amplifier 687, a jamming signal combiner 685, and a high pass filter 691.

Service denying switch 689 is under control of microprocessor 600. In the event of an addressed communication from headend 10 indicating, for example, that a subscriber is to be denied service for non-payment of a bill, service denying switch 689 may be opened thereby disconnecting service. The switch 689 may be closed and opened during scheduled periods of authorized periodic service. In addition or in the alternative, a high frequency amplifier 687 may be powered down under control of microprocessor 600 whenever service is to be denied. Otherwise or even in addition, amplifier 687 may be set at discrete gain levels, under microprocessor control, to provide supplemental gain to be broadband television signal if a subscriber has a plurality of television receivers (TV's and VCR's) over and above a nominal amount. Amplifier 687 may comprise adjustable bandpass filter circuits under microprocessor control for selectably limiting service bandwidth to a subscriber.

Alternatively, all subscriber jamming signal generating equipment, for example signal generating equipment 641-644, may be replaced by a programmable bandpass filter 691 which under the control of the microprocessor selectably limits service bandwidth to a subscriber.

An appropriate control signal waveform output SDPS is provided by microprocessor 600 for controlling switch 689. Also the same ON/OFF control signal that is used to control the switch 689 may control the powering up and down of amplifier 687 as control signal SDHP. The status of the connect/disconnect condition of switch 689 is preserved in NVM 570 or other memory associated with microprocessor 560 or microprocessor 600. Furthermore, the intended state of switch 689 or related denial circuits is to be always closed or connected. However, the normal state of the condition of switch 689 of a periodic service subscriber is open or disconnected.

Continuing the discussion of FIG. 6, jamming signals are interdicted at directional combiner 685 under microprocessor control. Because of the directional characteristic of radio frequency amplifier 687, jamming signals cannot inadvertently reach the common control circuitry of FIG. 5 or the serving cable. Highpass filter 691 of diplex filter 695 prevents any return path signals from reaching combiner 685 and passes the broadband spectrum including any jamming signals toward terminal OS. Reverse path signals, for example, in this embodiment may be radio frequency signals below 30 megahertz. The broadband television spectrum is presumed to be in the 50-550 megahertz range. However, interdiction of premium channel viewing may be allocated anywhere desired within a broader or discontinuous cable television spectrum to be jammed. Consequently, filters 691 and 692 are designed in accordance with this or similarly selected design criteria to block or pass broadband television or reverse path signals as required.

Microprocessor 600, responsive to common microprocessor 560, controls the frequency and power level outputs of four (or five if necessary) voltage controlled oscillators 641-644, each of which oscillators jams premium channel frequencies within an allocated continuous range of frequencies. The frequency of the oscillators is set over leads FREQ1-4 in a manner described in U.S. Pat. No. 4,912,760. A power level and ON/OFF operation of the oscillators 641-644 are controlled over leads OPWR1-4.

Since premium programming may be transmitted anywhere in the cable television spectrum, the sum of all such allocated portions comprises the entire television spectrum to be jammed (even where non-premium channels are normally transmitted). Also, in accordance with the depicted interdiction system, the television spectrum to be jammed may comprise discontinuous portions or intentionally overlapping portions.

A further detailed discussion of frequency control and the interdiction system of FIGS. 1, 5, and 6 may be found in U.S. application Ser. No. 5,014,309.

Figure 7:
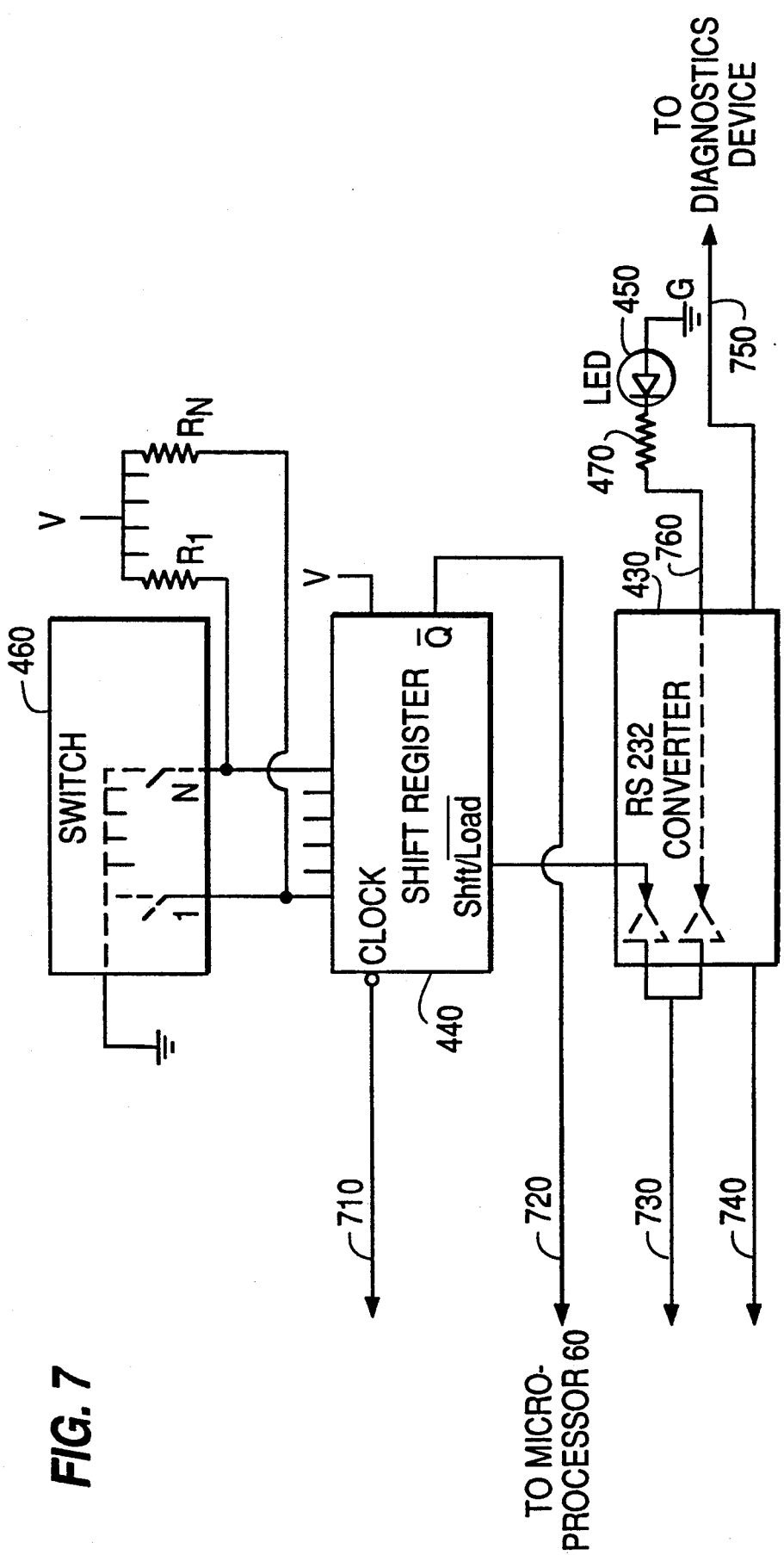
FIG. 7 is a schematic of a tamper override module.

FIG. 7 is a block circuit diagram of the TOM 400. TOM 400 includes an N terminal switch 460 and a voltage source V. The voltage source V is connected via N lines having N resistors, $R_1$-$R_N$ to switch 460. In one preferred embodiment, N may range from 2 to 8. Switch 460 is also connected to ground G. The N lines are additionally connected to N input of shift register 440. If the number of lines N is less than the number of input pins of the shift register, the remaining input pins are grounded. Switch 460 can be actuated to connect any of the N lines to ground G. Thus, each of the N lines supplies a voltage of either O or V to shift register 440 depending on whether the line is connected to ground G via switch 460.

Shift register 440 includes a clock pin and a output pin connected to the microprocessor 560 via lines 710 and 720, respectively. A voltage V is supplied to shift register 440 to supply power thereto. The shift/load pin is connected to converter 430, preferably an RS-232 converter. Line 730 connects microprocessor 560 to two separate pins of converter 430. The first pin receives the signal from line 730, inverts the signal, and outputs the inverted signal to the shift register. The second pin receives the signal from line 730, inverts the signal, and outputs the inverted signal via line 760. Line 740 additionally connects microprocessor 560 to converter 430. Together, lines 710, 720, 730, 740 comprise certain of the conductive leads 420 of extension 417 (FIG. 4). Line 750 connects the converter to, for example, a diagnostic or communications device (not shown) via interface 480 (FIG. 4). Line 760 connects converter 430 to a fist terminal of indicator 450 (an LED as shown here) via resistor 470. A second terminal of indicator 450 is connected to ground G. Indicator 450 may be any device capable conveying information, for example a buzzer, a lamp, liquid crystal display, or the like.

The power for the TOM 400 is preferably supplied from the enclosure 200 through power conversion circuit (not shown), for example, via certain of the conductive leads 420. Alternatively, TOM 400 may powered by a battery or in another manner known to those of skill in the art.

Figure 8:
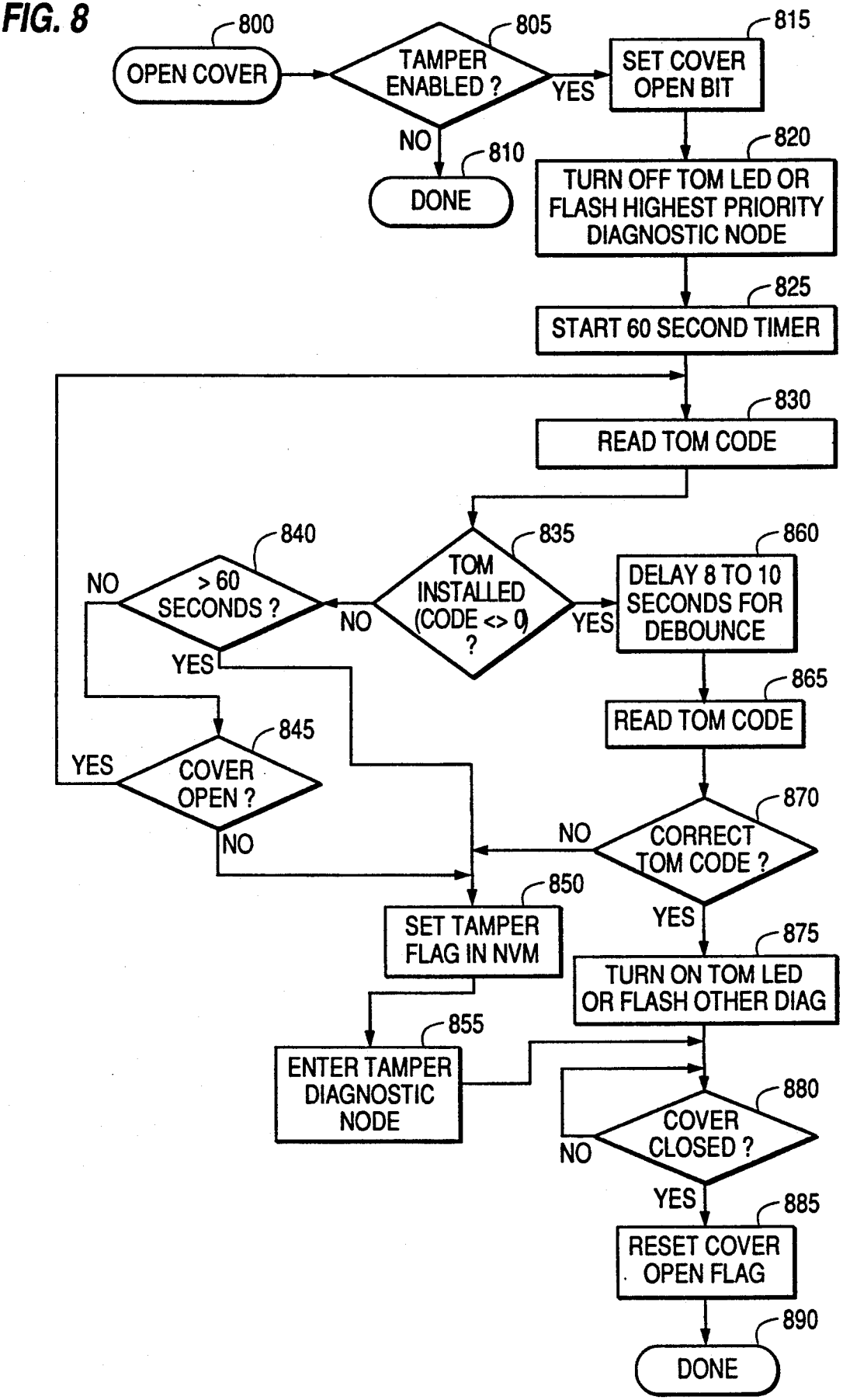
FIG. 8 is a block diagram illustrating the operation of a distribution apparatus and a tamper override module when coupled to an interface of the distribution apparatus.

The preferred operation of the present invention is described in connection with FIG. 8. When cover 220 of enclosure 200 is opened, tamper detector 555 signals microprocessor 560 at step 800. In response to the signal from tamper detector 555, microprocessor 560 determines if tamper mode is enabled from the enable/disable information stored in NVM 570 at step 805. If the tamper mode is disabled, further processes terminate at done box 810. If the tamper mode is enabled, microprocessor 560 sets a cover open bit flag in NVM 570 at step 815. Alternatively, tamper may be permanently enabled thereby obviating steps 805 and 810. Whenever tamper is enabled, it is assumed that the apparatus 20 has entered a tamper diagnostic mode of operation which is at a higher level of priority than any other diagnostic mode the apparatus may enter.

At step 820, initializing operations are performed. Depending on the diagnostic mode status of apparatus 20, the LED 450 is powered on if the only diagnostic mode in effect is a tamper diagnostic mode. However, if there is another diagnostic mode in effect other than a tamper diagnostic mode, which is the highest priority diagnostic mode, then, the LED 450 is signaled to flash in accordance with this diagnostic mode. The LED 450 is caused to flash at different rates depending on the diagnostic mode in effect. Other diagnostic modes besides a tamper diagnostic mode may include a refresh timer, a home power counter, an interdiction oscillator malfunction or other diagnostic mode at different levels of priority, the tamper mode being the highest of these levels. Features of apparatus 20 and operation and actuation of the several diagnostic modes are disclosed in copending application Ser. No. 07/896,628, filed concurrently herewith and incorporated herein by reference.

A timer internal of the microprocessor 560 is set to a predetermined time for timing a duration of 60 seconds at step 825. The predetermined time is preferably about 60 seconds but may be shorter or longer depending on the typical delay a service person may experience in opening cover 220 and inserting TOM 400. However, the predetermined time may be adjusted by interaction with headend 10 via addressable data transmitter 14. The system operator thus may vary the time interval via addressable data command to controller 560 as experience of the servicemen warrants its variation. Another consideration is that one would not want the duration to be so long as to permit a service pirate to steal service without actuating the tamper diagnostic mode.

At step 830 a read TOM code sequence is initiated. That is, the microprocessor 560 outputs a signal set which causes the TOM 400 to output an access code which it then senses. Specifically, the microprocessor 560 outputs a signal on line 730 to the converter 430 to cause enablement of the load data function of shift register 440. In addition, microprocessor 560 clocks the shift register 440 via line 710 to load the data on its input lines. Next, the microprocessor 560 signals the shift register via line 730 and converter 430 to enable the shift function of the shift register. Successive clock pulses applied to the shift register via line 710 causes that data to be serially output on line 720. The microprocessor senses that signal on line 720 to determine if a TOM 400 is installed at step 835. In one embodiment, the read sequence may be repeated twice or even several times in order to ensure that the result is correct.

If a TOM 400 is not installed, the microprocessor 560 checks the timer to determine if the predetermined time (here 60 seconds) has elapsed at step 840. If not, the microprocessor 560 determines if the enclosure cover is still open at step 845 by checking the status of the tamper detector 555. If the cover is still open, the process returns to step 830 and the TOM code is again read. If, at step 845, the cover is closed, the microprocessor sets a tamper detected flag in NVM at step 850 and the process proceeds to step 855 where the tamper diagnostic mode is entered. In a preferred embodiment, each subscriber module of the apparatus 20 goes immediately into a tamper diagnostic mode thereby interfering with the service provided to each subscriber connected to the apparatus 20. Interference with the service signal may be accomplished by control of the switch 689.

Alternatively, amplifier 687, oscillators 641-644, or other system components may be controlled to interfere with the service provided to the subscribers. The interference may comprise a cutoff of the signal, the supply of a scrambled signal or a signal which is periodically scrambled, the supply of a pulsing signal, or a combination thereof.

If the microprocessor 560 determines that the predetermined time has elapsed at step 840, the tamper detected flag is set and the diagnostic mode is entered at steps 850 and 855. The sequence of steps 850 and 855 as well as the sequence of steps 820, 825 may be reversed without adversely affecting the general operation of the present invention.

If the microprocessor 560 determines that a TOM 400 is installed at step 835, further action is suspended for 8 to 10 seconds to allow for debounce at step 860. The TOM code is again read at step 865. The microprocessor 560 then compares the access code supplied by the TOM 400 to the authorized access code stored in NVM 570 at step 870. If the codes do not match, the process proceeds to steps 850 and 855 wherein the tamper detected flag is set and the diagnostic mode is entered. If the access code supplied by the TOM 400 matches the authorized access code, the process moves to step 875 and the microprocessor 560 signals the converter 430 via line 730. Responsive to such signal, the converter 430 actuates the indicator 450 (here, the LED is illuminated) to indicate that the access code was correctly entered. If the apparatus is in a diagnostic mode other than a tamper mode, LED 450 is caused to continue flashing the LED at a rate consistent with that diagnostic mode. If, for example, the refresh timer diagnostic mode is in effect and the signal distribution apparatus is in such diagnostics mode, the microprocessor 560 signals the indicator 450 via line 730 and converter 430 to indicate such diagnostic mode.

After the diagnostic mode is entered at step 855 or after step 875, the microprocessor 560 waits for a signal from the temper detector 555 indicating that the cover is closed. Thus, according to the preferred embodiment, TOM 400 can be removed to provide a service person with access to motherboard 240 below or for other maintenance. When the cover closed signal is received, the microprocessor 560 rests the cover open flag in NVM 570 at step 885 and the process is completed at done step 890.

In an alternative embodiment, it is suggested that the tamper detector 555 and tamper plunger 237 may be operated as a signaling mechanism in the absence of TOM 400. In this embodiment of apparatus 20, a predetermined code may be signaled as if plunger 237 were a pulsing device. Microprocessor 560 then may operate to determine a several digit code which must be input in accordance with predetermined criteria. For example, the code must be tapped into the apparatus 20 at a particular predetermined rate for each digit with a predetermined delay that must be exceeded between entry of each digit. If the code is accepted, the apparatus 20 may be satisfied and a tamper diagnostic mode avoided.

Alternative embodiments and operation of the tamper override capability are now discussed. For example, the tamper status flag indicating an open cover may be re-enabled 60 seconds after TOM 400 is removed from interface 245 rather than after cover 220 is closed. Of course, re-enablement of the tamper status flag may be triggered according to the occurrence of another event as will be apparent one of skill in the art. In any of the above described embodiments involving a plunger 237, the plunger 237 may be provided with a cap or a cover to prevent accidental actuation by the service person whenever the service person is working on apparatus 20.

While the principles of the present invention have been described above in conjunction with specific apparatus, it is to be understood that this description is made only by way of example and not as a limitation to the scope of the invention.

We claim:

1. A broadband signal distribution apparatus for receiving broadband signals from a remote headend and for outputting broadband signals to at least one subscriber location comprising:
    an enclosure;
    an input terminal for receiving an input broadband signal from the remote headend;
    a signal processor for generating an output broadband signal
    an output terminal for outputting the output broadband signal to the at least one subscriber location;
    a tamper detector for detecting if said enclosure is accessed;
    entry code receiving means for receiving an entry code applied to obtain authorized access to said enclosure;
    storing means for storing an authorized access code;
    comparing means for comparing an entry code received by said entry code receiving means with the authorized access code; and
    controlling means responsive to said tamper detector and said comparing means for controlling said signal processor so that the output broadband signal generated by said signal processor is an interference signal when said enclosure is accessed and the received entry code does not match the authorized access code.

2. The apparatus of claim 1, wherein said storing means comprises a nonvolatile memory device.

3. The apparatus of claim 1, wherein said comparing means comprises a microprocessor.

4. The apparatus of claim 1, wherein said entry code receiving means comprises an interface adapted for connection to an entry code generator.

5. The apparatus of claim 1, wherein said entry code receiving means comprises a plunger.

6. The apparatus of claim 1, wherein said entry code receiving means and said tamper detector comprise a plunger.

7. The apparatus of claim 1, wherein:
    said entry code receiving means comprises an interface adapted for connection to an entry code generator;
    said storing means comprises a nonvolatile memory device; and said comparing means comprises a microprocessor.

8. The apparatus of claim 7, wherein said input terminal further receives an authorized access code signal from said headend and wherein said storing means stores the authorized access code signal as the authorized access code.

9. The apparatus of claim 1, wherein:
    said enclosure comprises a casing having an aperture and a displaceable cover closing said aperture; and
    said tamper detector comprises a switch mounted on said casing, said switch occupying a first position when said aperture is closed by said cover and occupying a second position when said cover is displaced thereby opening said aperture.

10. The apparatus of claim 1, wherein said controlling means further controls said signal processor so that the output broadband signal generated by said signal processor is an interference signal when said enclosure is accessed and an entry code is not applied within a predetermined time after access is detected.

11. A method of screening access to a broadband signal distribution apparatus comprising an input terminal for receiving an input broadband signal from a remote headend, an output terminal for outputting a signal supplied thereto to at least one subscriber location, and an enclosure housing said input terminal and said output terminal, the method comprising the steps of:
storing an authorized access code in a memory;
detecting access to said enclosure;
determining whether an entry code for obtaining authorized access to said enclosure is applied;
if an entry code is applied, comparing the applied entry code to the authorized access code; and
generating an interference signal and supplying the interference signal to said output terminal when access to said enclosure is detected and either the applied entry code does not match the authorized access code or an entry code is not applied.

12. The method of claim 11, wherein said step of determining comprises:
sensing for a predetermined time after access is detected whether an entry code is applied; and
determining that an entry code is not applied if an entry code is not sensed within the predetermined time.

13. The method of claim 11, wherein said broadband signal distribution apparatus comprises an interface for receiving the entry code and said step of applying comprises:
connecting an entry code generator to said interface.

14. The method of claim 11, wherein said step of storing comprises the steps of:
receiving an authorized access code signal from the headend; and
storing the authorized access code signal as the authorized access code.

15. An entry code generator for accessing a broadband signal distribution apparatus in a broadband signal distribution system, said broadband signal distribution apparatus having a tamper prevention system, receiving broadband signals from a remotely located headend, and outputting broadband signals to at least one subscriber location, said entry code generator comprising:
setting means for setting an entry code for disabling the tamper prevention system;
an interface adapted to be coupled on location to the broadband signal distribution apparatus; and
means for outputting the entry code through said interface to the broadband signal distribution apparatus thereby disabling said tamper prevention system and permitting access to said broadband signal distribution apparatus.

16. The entry code generator of claim 15, wherein said means for setting an entry code is a switch.

17. The entry code generator of claim 15, wherein said interface receives diagnostic signals from the broadband cable distribution apparatus, the the entry code generator further comprises:
a further interface adapted to be connected to a diagnostic device; and
converting means coupled to said interface for converting the diagnostic signals to transmission diagnostic signals and for outputting the transmission diagnostic signals through said further interface to the diagnostic device.

18. The entry code generator of claim 15, wherein said converting means is a TTL to RS-232 converter.

19. The entry code generator of claim 15, wherein said means for outputting the entry code comprises a means for sequentially outputting the entry code.

20. The entry code generator of claim 19, wherein said means for sequentially outputting the entry code comprises a shift register.

21. The entry code generator of claim 15 having a body adapted to fit within a cavity of the broadband signal distribution apparatus when a cover thereof is open and to couple with an interface of the apparatus, the body having at least one ear such that when the entry code generator is coupled to the apparatus, the cover thereof is precluded from closing.

22. The entry code generator of claim 21, the body thereof having a top portion and a bottom portion, and an extension from the bottom portion, the extension being offset from the center of the bottom portion.

23. The apparatus of claim 1, wherein said signal processor comprises modulating means responsive to said controlling means for modulating a broadband signal to produce the interference signal.

24. The apparatus of claim 23, wherein said modulating means comprises means for alternately connecting and disconnecting a broadband signal to said output terminal.

25. The apparatus of claim 24, wherein said means for alternately connecting and disconnecting comprises a switch.

26. The apparatus of claim 23, wherein said modulating means modulates the input broadband signal to produce the interference signal.

27. The apparatus of claim 9, wherein said signal processor comprises modulating means responsive to said controlling means for modulating the input broadband signal to produce the interference signal.

28. The apparatus of claim 27, wherein said modulating means comprises means for alternately connecting and disconnecting the input broadband signal to said output terminal.

29. The apparatus of claim 28, wherein said means for alternately connecting and disconnecting comprises a switch.

30. The apparatus of claim 29, wherein:
said entry code receiving means comprises an interface adapted for connection to an entry code generator;
said storing means comprises a nonvolatile memory device; and
said comparing means comprises a microprocessor.

31. The method according to claim 11, wherein said step of generating comprises modulating the input broadband signal to produce the interference signal.

32. The apparatus of claim 31, wherein said step of modulating comprises alternately connecting and disconnecting the input broadband signal to said output terminal.

33. The entry code generator of claim 15, further comprises:
receiving means for receiving a signal from the broadband signal distribution apparatus indicating that the entry code is correct; and
an indicator, responsive to the received signal, for providing an external indication that the entry to the broadband signal apparatus is authorized.

34. The entry code generator of claim 23, wherein said indicator is a light-emitting diode.

* * * * *